United States Patent
Jung et al.

(10) Patent No.: US 7,596,579 B2
(45) Date of Patent: Sep. 29, 2009

(54) METHOD OF REPRODUCING AN INFORMATION STORAGE MEDIUM HAVING DATA STRUCTURE FOR BEING REPRODUCED ADAPTIVELY ACCORDING TO PLAYER STARTUP INFORMATION

(75) Inventors: Kil-soo Jung, Taean-eup (KR); Seong-jin Moon, Suwon-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 10/796,284

(22) Filed: Mar. 10, 2004

(65) Prior Publication Data

US 2005/0114396 A1 May 26, 2005

Related U.S. Application Data

(60) Provisional application No. 60/456,204, filed on Mar. 21, 2003.

(30) Foreign Application Priority Data

| | | | |
|---|---|---|---|
| Mar. 14, 2003 | (KR) | | 10-2003-0016015 |
| Aug. 25, 2003 | (KR) | | 10-2003-0058889 |
| Sep. 3, 2003 | (KR) | | 10-2003-0061575 |
| Sep. 3, 2003 | (KR) | | 10-2003-0061576 |

(51) Int. Cl.
*G06F 7/00* (2006.01)
*G06F 17/30* (2006.01)
*G06F 3/00* (2006.01)

(52) U.S. Cl. ................. 707/104.1; 707/10; 715/748

(58) Field of Classification Search ............ 707/1, 707/4, 10, 100–101, 200–201, 104.1, 102; 709/230, 246; 386/95, 125, 83, 97; 715/748; 725/51, 115; 704/235, 257
See application file for complete search history.

(56) References Cited

U.S. PATENT DOCUMENTS 5,652,824 A * 7/1997 Hirayama et al. ............ 386/95
5,784,528 A 7/1998 Yamane et al.

(Continued)

FOREIGN PATENT DOCUMENTS

EP 1 288 950 A1 3/2003

(Continued)

OTHER PUBLICATIONS

Office Action issued in Taiwanese Patent Application No. 93106608 on Apr. 17, 2006.

(Continued)

*Primary Examiner*—Miranda Le
(74) *Attorney, Agent, or Firm*—Stein McEwen, LLP

(57) ABSTRACT

An information storage medium includes: AV data; interactive data, which is displayed along with an AV picture obtained from the AV data, and provides contents related to the AV picture, when the AV data is reproduced in an interactive mode; and language information, which indicates a language of contents contained in the interactive data. Therefore, it is possible to select an ENAV application to be first executed in the interactive mode and reproduces the selected ENAV application with a language readable by a user.

15 Claims, 8 Drawing Sheets

U.S. PATENT DOCUMENTS

| | | | |
|---|---|---|---|
| 5,956,716 A * | 9/1999 | Kenner et al. | 707/10 |
| 5,963,265 A * | 10/1999 | Bae et al. | 348/465 |
| 5,966,352 A * | 10/1999 | Sawabe et al. | 386/126 |
| 6,253,221 B1 * | 6/2001 | Kim | 715/536 |
| 6,345,147 B1 | 2/2002 | Mimura et al. | |
| 6,377,747 B1 * | 4/2002 | Murase et al. | 386/99 |
| 6,396,997 B2 | 5/2002 | Moriyama et al. | |
| 6,429,364 B1 * | 8/2002 | Muraki et al. | 84/600 |
| 6,507,696 B1 * | 1/2003 | Chung et al. | 386/125 |
| 6,512,552 B1 * | 1/2003 | Subramanian | 348/564 |
| 6,611,655 B1 * | 8/2003 | Murase et al. | 386/99 |
| 6,654,901 B1 * | 11/2003 | Nakai et al. | 714/1 |
| 6,661,466 B1 * | 12/2003 | Kou | 348/553 |
| 6,741,797 B2 * | 5/2004 | Tozaki et al. | 386/95 |
| 6,775,467 B1 * | 8/2004 | Su | 386/125 |
| 6,778,759 B1 * | 8/2004 | Yamada et al. | 386/95 |
| 6,977,690 B2 * | 12/2005 | Gomikawa | 348/468 |
| 7,047,191 B2 * | 5/2006 | Lange et al. | 704/235 |
| 7,054,888 B2 * | 5/2006 | LaChapelle et al. | 707/104.1 |
| 7,068,920 B1 * | 6/2006 | Stahl | 386/125 |
| 7,116,894 B1 * | 10/2006 | Chatterton | 386/95 |
| 7,178,106 B2 | 2/2007 | Lamkin et al. | |
| 2002/0053085 A1 * | 5/2002 | Toguri | 725/51 |
| 2002/0067667 A1 | 6/2002 | Watanabe | |
| 2002/0071657 A1 | 6/2002 | Ando et al. | |
| 2002/0085028 A1 * | 7/2002 | Tabatabai et al. | 345/748 |
| 2003/0012558 A1 * | 1/2003 | Kim et al. | 386/97 |
| 2003/0152366 A1 * | 8/2003 | Kanazawa et al. | 386/69 |
| 2003/0161615 A1 * | 8/2003 | Tsumagari et al. | 386/95 |
| 2003/0177270 A1 * | 9/2003 | Noda et al. | 709/246 |
| 2003/0204852 A1 * | 10/2003 | Fenwick et al. | 725/83 |

FOREIGN PATENT DOCUMENTS

| | | |
|---|---|---|
| EP | 1288950 | 3/2003 |

OTHER PUBLICATIONS

U.S. Appl. No. 10/796,272, filed Mar. 10, 2004, Kil-Soo Jung et al., Samsung Electronics Co., Ltd.

U.S. Appl. No. 10/796,282, filed Mar. 10, 2004, Kil-Soo Jung et al., Samsung Electronics Co., Ltd.

Office Action issued on Nov. 16, 2006, in Taiwanese Application No. 093106607 (including English translation)..

Examination Report issued on Jul. 24, 2007, in Indian Patent Application No. 931/MUMNP/2005 (incorporating Written Opinion of the International Searching Authority in International Application No. PCT/KR2004/000525).

Malaysian Substantive Examination Adverse Report issued on May 22, 2009, in Malaysian Application No. PI 20040866 (5 pages, in English).

Malaysian Substantive Examination Adverse Report issued on May 22, 2009, in Malaysian Application No. PI 20040867 (4 pages, in English).

International Search Report and Written Opinion of the International Searching Authority issued on Jun. 24, 2004, in International Application No. PCT/KR2004/000525 (6 pages, in English).

* cited by examiner

FIG. 7

<STARTUP.MLS>

```
<startup>
    <walledgarden href="file://dvdrom:/DVD_ENAV/walledgarden.1st"/>       A
    <loadinginfo href="file://dvdrom:/DVD_ENAV/LoadingInformation1.ldi">
        <condition name="lang" value="en"/>
    </loadinginfo>                                                         B
    <loadinginfo href="file://dvdrom:/DVD_ENAV/LoadingInformation2.ldi">
        <condition name="lang" value="kr"/>
    </loadinginfo>
</startup>
```

FIG. 8

<STARTUP.MLS>

```
<startup>
    <walledgarden uri="dvd://dvd_enav/walledgarden.1st"/>                  C
    <application uri="dvd://dvd_enav/LoadingInformation1.1di">
        <condition capability="locale"/>
            <param name="lang" value="en"/>
        </condition>
    </application>                                                         D
    <application uri="dvd://dvd_enav/LoadingInformation2.1di">
        <condition capability="locale"/>
            <param name="lang" value="kr"/>
        </condition>
    </application>
</startup>
```

FIG. 9

| SYSTEM PARAMETER | MEANINGS |
|---|---|
| 0 | Menu Description Language Code(M_LCD) |
| 1 | Audio stream number(ASTN) for Title Domain(TT_DOM) |
| 2 | Sub-picture stream number(SPSTN) and On/OFF flag for TT_DOM |
| 3 | Angle number(AGLN) for TT_DOM |
| 4 | Title number(TTN) for TT_DOM |
| 5 | VTS Title number(VTS_TTN) for TT_DOM |
| 6 | Title PGC number(TT_PGCN) for TT_DOM |
| 7 | Part_of Title number(PTTN) for One_Sequential_PGC_Title |
| 8 | Highlighted Button number(HL_BTNN) for Selection state |
| 9 | Navigation Timer(NV_TMR) |
| 10 | TT_PGCN for NV_TMR |
| 11 | Player Audio Mixing Mode(P_AMXMD) for Karaoke |
| 12 | Country Code(CTY_CD) for Parental Management |
| 13 | Parental Level(PTL_LVL) |
| 14 | Player Configuration(P_CFG) for Video |
| 15 | P_CFG for Audio |
| 16 | Initial Language Code(INI_LCD) for Audio Stream(AST) |
| 17 | Initial Language Code extension(INI_LCD_EXT) for AST |
| 18 | INI_LCD for Sub-picture Stream(SPST) |
| 19 | INI_LCD_EXT for SPST |
| 20 | Player Region Code |
| 21 | Initial Language Code(INI_LCD) for ENAV Application |
| 22 | |
| 23 | |

FIG. 10

| b15 | b14 | b13 | b12 | b11 | b10 | b9 | b8 |
|-----|-----|-----|-----|-----|-----|----|----|
| RESERVED | | | | | | | |

| b7 | b6 | b5 | b4 | b3 | b2 | b1 | b0 |
|----|----|----|----|----|----|----|----|
| INI-LCD | | | | | | | |

METHOD OF REPRODUCING AN INFORMATION STORAGE MEDIUM HAVING DATA STRUCTURE FOR BEING REPRODUCED ADAPTIVELY ACCORDING TO PLAYER STARTUP INFORMATION

CROSS-REFERENCE TO RELATED APPLICATIONS

This application claims priority from Korean Patent Application No. 2003-16015, filed on Mar. 14, 2003, Korean Patent Application No. 2003-58889, filed on Aug. 25, 2003, Korean Patent Application No. 2003-61575, filed on Sep. 3, 2003, Korean Patent Application No. 2003-61576, filed on Sep. 3, 2003, in the Korean Intellectual Property Office, U.S. Provisional Application No. 60/456,204, filed on Mar. 21, 2003, in the U.S. Patent & Trademark Office, the disclosures of which are incorporated herein in their entireties by reference.

BACKGROUND OF THE INVENTION

1. Field of the Invention

The present invention relates to an apparatus and method of reproducing Audio-Visual (AV) data in an interactive mode, and an information storage medium therefor.

2. Description of the Related Art

PC-based DVDs (hereinafter, referred to as "interactive DVD") capable of reproducing Audio-Visual (AV) data in an interactive mode have been on the market. The interactive DVD stores interactive data supporting an interactive function as well as AV data according to a conventional DVD-Video standard. The AV data recorded on the interactive DVD can be displayed in two modes: one is a video mode in which AV data is displayed in the same form as in a general DVD-Video and the other is an interactive mode in which an AV picture that is reproduced from AV data is embedded and displayed in an interactive picture that is reproduced from interactive data. For example, in a case where the AV data is a movie title, a corresponding movie is shown on the AV picture and various additional information including the scenario of the movie, the story of the movie, the pictures of casts, etc., is displayed on the interactive picture. The additional information can be displayed in synchronization with the movie title (AV data). For example, when a specific actor appears, interactive data containing his/her personal history information can be reproduced and displayed.

The interactive data includes a markup document written in a markup language; a script code as an internal file of a markup document or as a separate file to be linked with the markup document; and an audio file, an animation file, an image file, etc., to be linked with the markup document and be reproduced along with the markup document.

Considering that the interactive mode is aimed to provide a user with various additional contents using markup documents, the effect is very low if a markup document containing additional contents made with a language that a user is unable to read is displayed in an interactive mode.

SUMMARY OF THE INVENTION

The present invention provides an information storage medium, having a data structure capable of selecting additional contents made with a language selected by a user or with a predetermined language and reproducing AV data in an interactive mode when an information storage medium storing the AV data is reproduced, and a reproducing apparatus and reproducing method thereof.

According to an aspect of the present invention, there is provided an information storage medium including AV data, interactive data, which is displayed along with an AV picture obtained from the AV data, and provides contents related to the AV picture, when the AV data is reproduced in an interactive mode, and language information, which indicates a language of contents contained in the interactive data.

Additional aspects and/or advantages of the invention will be set forth in part in the description which follows and, in part, will be obvious from the description, or may be learned by practice of the invention.

According to another aspect of the present invention, there is provided an information storage medium including AV data, a plurality of enhanced navigation (ENAV) applications, each of which includes substantially the same contents and is made with a plurality of different languages in order to reproduce the AV data in an interactive mode, and language information, which is used to select one among the plurality of ENAV applications.

According to still another aspect of the present invention, there is provided a reproducing apparatus including an AV reproducing engine which decodes AV data, and an ENAV engine, which includes player language information selecting one among a plurality of ENAV applications, each of which includes substantially the same contents and is made with a plurality of different languages, and interprets and executes a selected ENAV application with reference to the player language information in order to reproduce the AV data in an interactive mode.

According to still yet another aspect of the present invention, there is provided a reproducing method of reproducing AV data in an interactive mode, the method including reading language information indicating a language used with contents contained in interactive data; selecting and reading interactive data made with the same language as player language information set in a reproducing apparatus with reference to the read language information; and interpreting and executing the read interactive data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 shows a startup file STARTUP.MLS according to an embodiment of the present invention;

FIG. 8 shows a startup file STARTUP.MLS according to another embodiment of the present invention;

FIG. 9 shows a system parameter table in which profile information is listed, according to an embodiment of the present invention;

FIG. 10 is a view explaining a data structure of profile information recorded as a system parameter of FIG. 9.

DETAILED DESCRIPTION OF THE EMBODIMENTS

Figure 1:
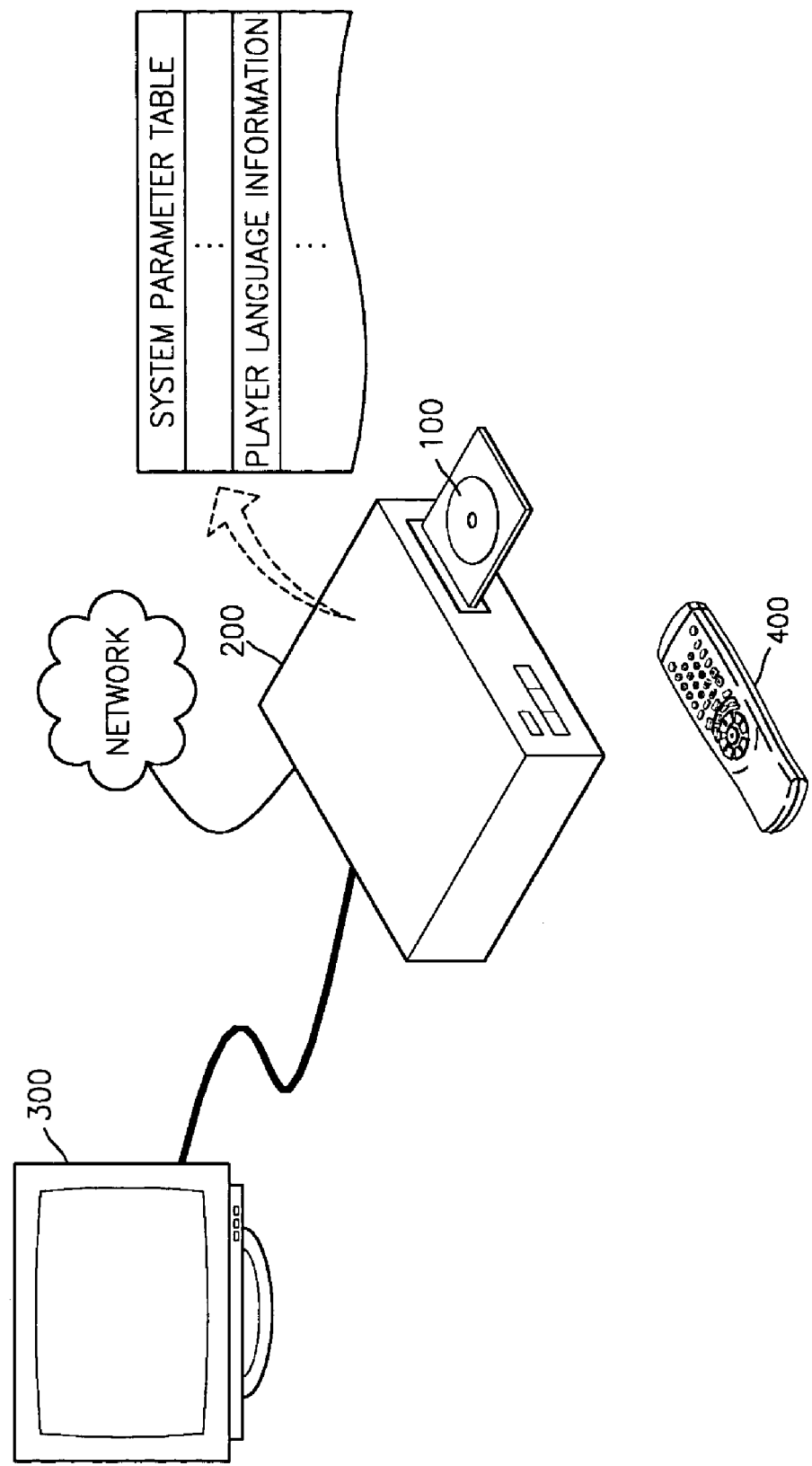
FIG. 1 shows a reproduction system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, embodiments of the present invention will be described in detail with reference to the appended drawings. In this specification, "interactive data" refers to data recorded to support an interactive mode and includes a markup document recorded with a markup language and/or a script code, a script code file linked with a markup document or provided separately, a program file, an audio file, an animation file, and an image file as resource files, etc., to be linked with a markup document and displayed with the markup document. That is, the interactive data acts as additional contents being provided with AV data, as well as acts as an application program required to reproduce the AV data in an interactive mode.

FIG. 1 shows a reproduction system according to an embodiment of the present invention. Referring to FIG. 1, the reproduction system comprises an enhanced navigation (ENAV) disk 100 as an information storage medium that supports an interactive mode, a reproducing apparatus 200, a display apparatus 300, for example a TV, and a remote controller 400 as a user input device. The remote controller 400 receives a control command input from a user and transfers it to the reproducing apparatus 200. The reproducing apparatus 200 reproduces AV data recorded on the ENAV disk 100. If the ENAV disk 100 is loaded in a DVD drive included in the reproducing apparatus 200 and a user selects an interactive mode, the reproducing apparatus 200 reproduces the ENAV disk 100 in the interactive mode and transfers reproduced data to the display apparatus 300. The display apparatus 300 displays both an AV picture corresponding to the reproduced AV data and an interactive picture obtained from an interactive application. "Interactive mode" refers to a method of displaying an AV picture on a display window defined in a markup document as an interactive application, that is, a method of displaying both an AV picture and an interactive picture in a manner that the AV picture is embedded in the interactive picture. Here, the AV picture represents a picture in which DVD-Video data recorded on the ENAV disk 100 is reproduced by the reproducing apparatus 200 and is displayed on the display apparatus 300. The interactive picture represents a picture in which an interactive application recorded on the ENAV disk 100 is interpreted and executed by the reproducing apparatus 200 and is displayed on the display apparatus 300. Meanwhile, "video mode" refers to a method of reproducing AV data according to a method defined in a conventional DVD-Video, that is, a method of displaying only an AV picture obtained by reproducing the corresponding AV data. In this embodiment, the reproducing apparatus 200 supports both the interactive mode and the video mode. Furthermore, the reproducing apparatus 200 can receive AV data and/or interactive data through a network.

The reproducing apparatus 200 has a system parameter table containing system parameters (SPRMs). The system parameter table includes player language information. The reproducing apparatus 200 selects interactive data to be used in the interactive mode with reference to the player language information. The SPRMs may be stored in a memory in the reproducing apparatus 200.

The disk 100 also stores language information indicating a language used in the contents of the stored interactive data. The language information recorded on the disk is substantially the same as the player language information stored in SPRMs, however, the disk language information is different from the player language information in that the disk language information is recorded on the disk 100 and indicates corresponding interactive data.

When the interactive mode is selected, the reproducing apparatus 200 reads language information recorded on the ENAV disk 100, compares the read language information with its own player language information stored as a system parameter, and performs reproduction using interactive data selected according to the compared result.

Figure 2:
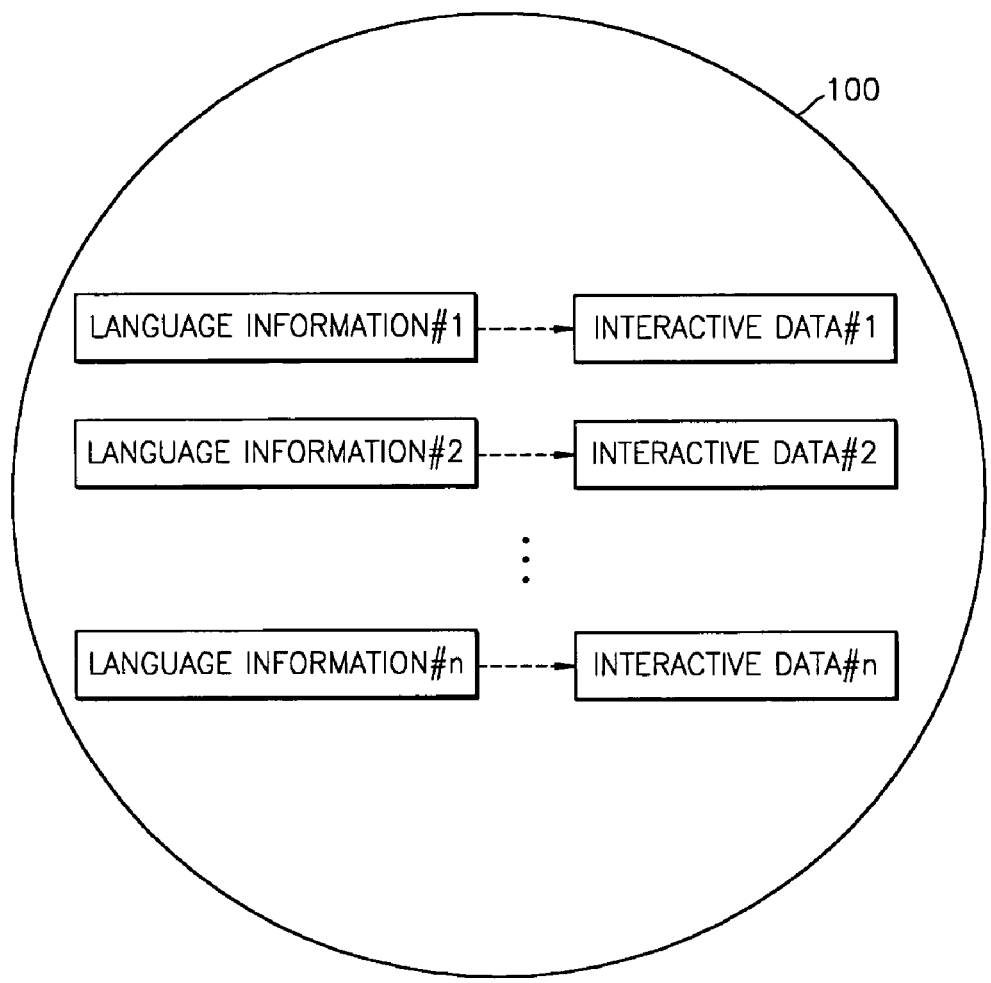
FIG. 2 is a view explaining operations of an ENAV disk according to the present invention.

FIG. 2 is a view explaining the operations of the ENAV disk 100. Referring to FIG. 2, interactive data corresponding to language information is recorded on the ENAV disk 100. That is, interactive data #1 corresponding to language information #1 exists, interactive data #2 corresponding to language information #2 exists, . . . , interactive data #n corresponding to language information #n exists, wherein n is an integer.

The language information (#1, #2, . . . , #n) may be recorded separately from the interactive data (#1, #2, . . . , #n) and can be linked with the interactive data (#1, #2, . . . , #n), or can be recorded as one part of the interactive data (#1, #2, . . . , #n).

If player language information set in the reproducing apparatus 200 is the same as the language information #2, the reproducing apparatus 200 gets the interactive data #2 corresponding to the language information #2 and reproduces corresponding AV data in an interactive mode. For example, if the player language information is "English", the reproducing apparatus 200 uses interactive data corresponding to language information "English" among interactive data recorded on the ENAV disk 100.

Figure 3:
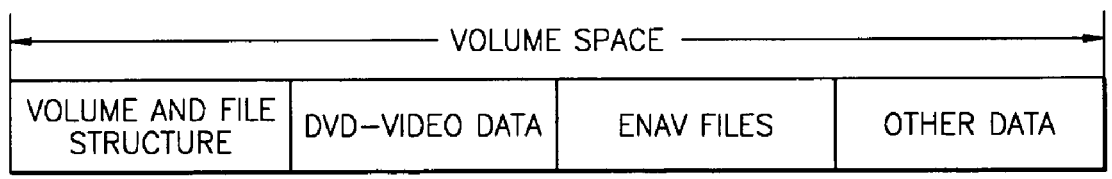
FIG. 3 shows a volume space of the ENAV disk shown in FIG. 2 according to an embodiment of the present invention.

FIG. 3 shows a volume space of the ENAV disk 100 according to an embodiment of the present invention. Referring to FIG. 3, the volume space of the ENAV disk 100 includes a Volume and File structure area recording information related to volume and file, a DVD-Video Data area recording AV data or video titles in a DVD-Video format, and an ENAV file area recording ENAV files supporting an interactive mode.

The DVD-Video data area includes VIDEO_TS.IFO containing reproduction control information for all video titles recorded on the ENAV disk 100, VTS_01_0.IFO containing reproduction control information of a first video title, and VTS_01_0.VOB, VTS_01_1.VOB, . . . , as AV data constructing video titles. VTS_01_0.VOB, VTS_01_1. VOB, . . . are video titles, that is, video objects. Each VOB contains VOBU in which a navigation pack, a video pack, and an audio pack are packaged. The detailed construction of these data areas are disclosed in "DVD-Video for Read Only Memory Disc 1.0" of a conventional DVD-Video standard.

The ENAV file area stores an ENAV application consisting of a plurality of ENAV files. That is, the ENAV file area stores as the ENAV files, a startup file to be first read when an interactive mode is selected, a markup document corresponding to a selected video title, etc.

As such, the interactive data is recorded as a plurality of ENAV files. The ENAV files include the following: a markup document; a script code file; a program file; a style sheet designating a style of a markup document; and an audio file, animation file, an image file, etc. as resource files to be linked with the markup document and be displayed along with the markup document, as described above.

Figure 4:
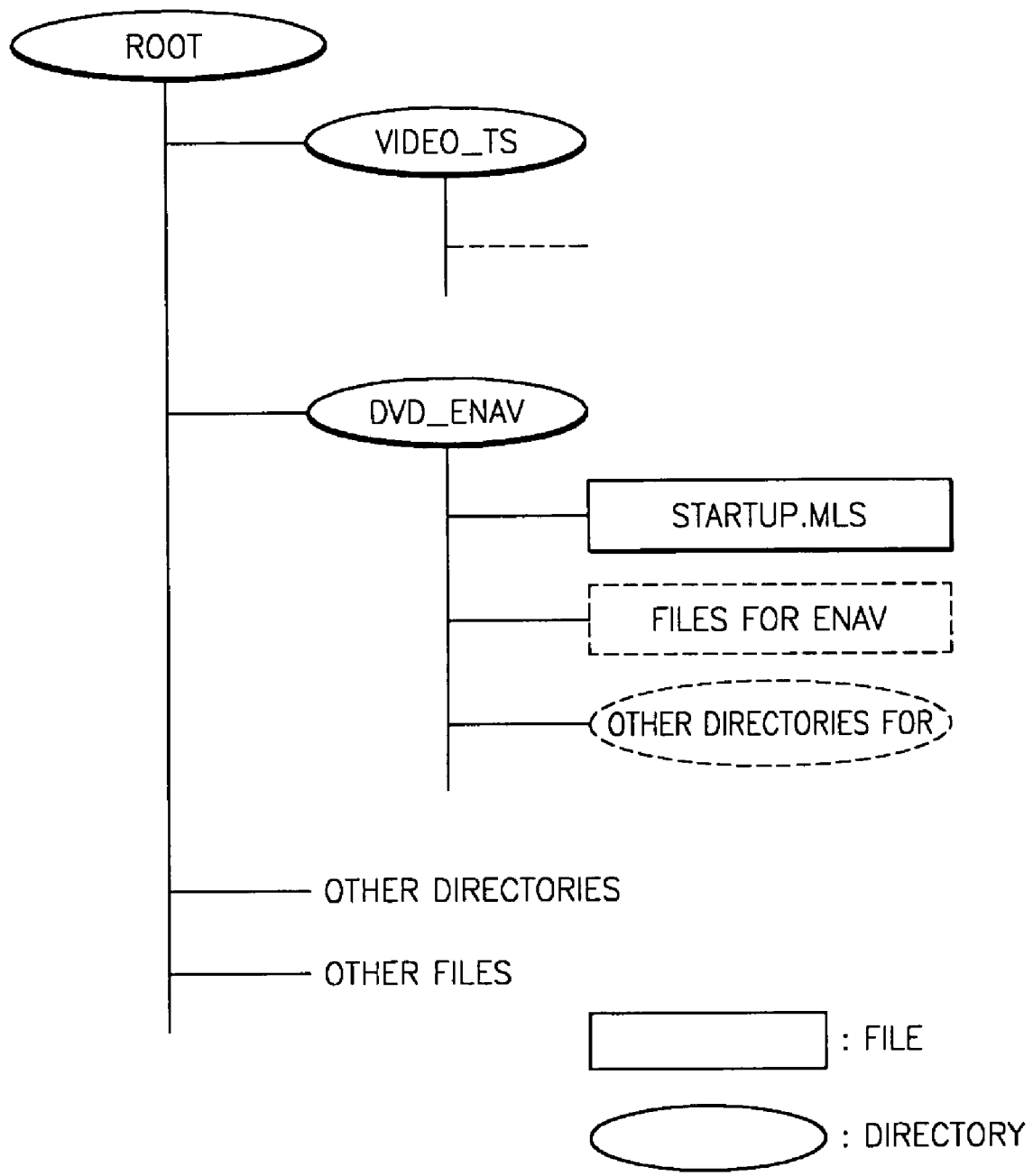
FIG. 4 is a diagram illustrating a directory structure of the ENAV disk shown in FIG. 2 according to an embodiment of the present invention.

FIG. 4 is a diagram illustrating a directory structure of the ENAV disk 100 according to an embodiment of the present invention. Referring to FIG. 4, a root directory has a DVD video directory VIDEO_TS and an ENAV directory DVD_ENAV storing ENAV data supporting an interactive mode.

The DVD video directory VIDEO_TS stores data described above with reference to FIG. 3, that is, VIDEO_TS.IFO, VTS_01_0.IFO, VTS_01_0.VOB, VTS_01_1.VOB, etc. The ENAV directory DVD_ENAV stores data described above with reference to FIG. 3, that is, a startup file STARTUP.MLS and other ENAV files.

Figure 5:
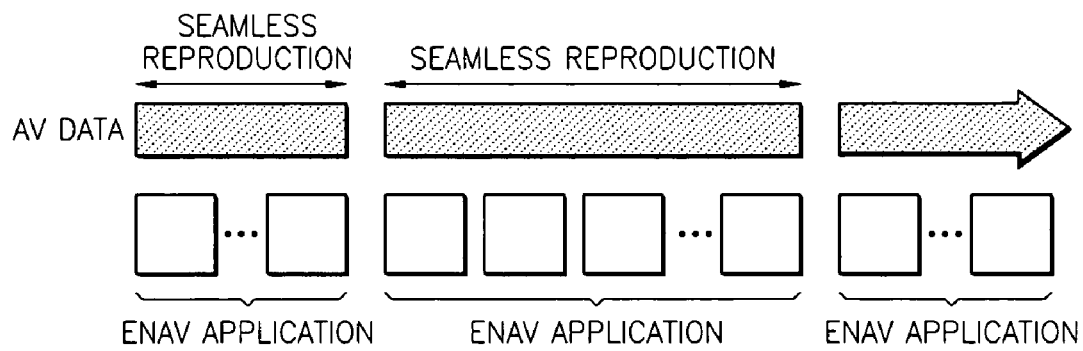
FIG. 5 shows a relationship between AV data and ENAV files recorded on the ENAV disk shown in FIG. 2 according to an embodiment of the present invention.

FIG. 5 shows a relationship between the AV data and the ENAV files recorded on the ENAV disk 100 according to an embodiment of the present invention. Referring to FIG. 5, the ENAV disk 100 stores ENAV applications corresponding respectively to AV data, ensuring seamless reproduction. One ENAV application is a set of a plurality of ENAV files. To ensure seamless reproduction of AV data, an ENAV application corresponding to the AV data is buffered in advance before the AV data is reproduced in an interactive mode.

Each ENAV application includes one loading information file. The loading information file stores location information of ENAV files that is needed to reproduce the corresponding AV data in the interactive mode. The location information of ENAV files includes location information for ENAV files to be buffered in advance before the corresponding ENAV application is launched, that is, location information of ENAV files to be preloaded.

Because preloading is performed for each ENAV application, seamless reproduction is ensured for AV data corresponding to each ENAV application. Accordingly, in a view of a user interface, a contents provider makes ENAV applications in a manner that one ENAV application corresponds to 1 piece of video title or 1 chapter of video title in order to ensure seamless reproduction.

Meanwhile, as a contrast to preloading, post-loading is to buffer a desired ENAV file after a corresponding ENAV application is launched. One ENAV application does not always include an ENAV file to be post-loaded. If post-loading is needed, post-load information required with post-loading, i.e., location information of ENAV files to be post-loaded, is recorded on the loading information file.

Figure 6:
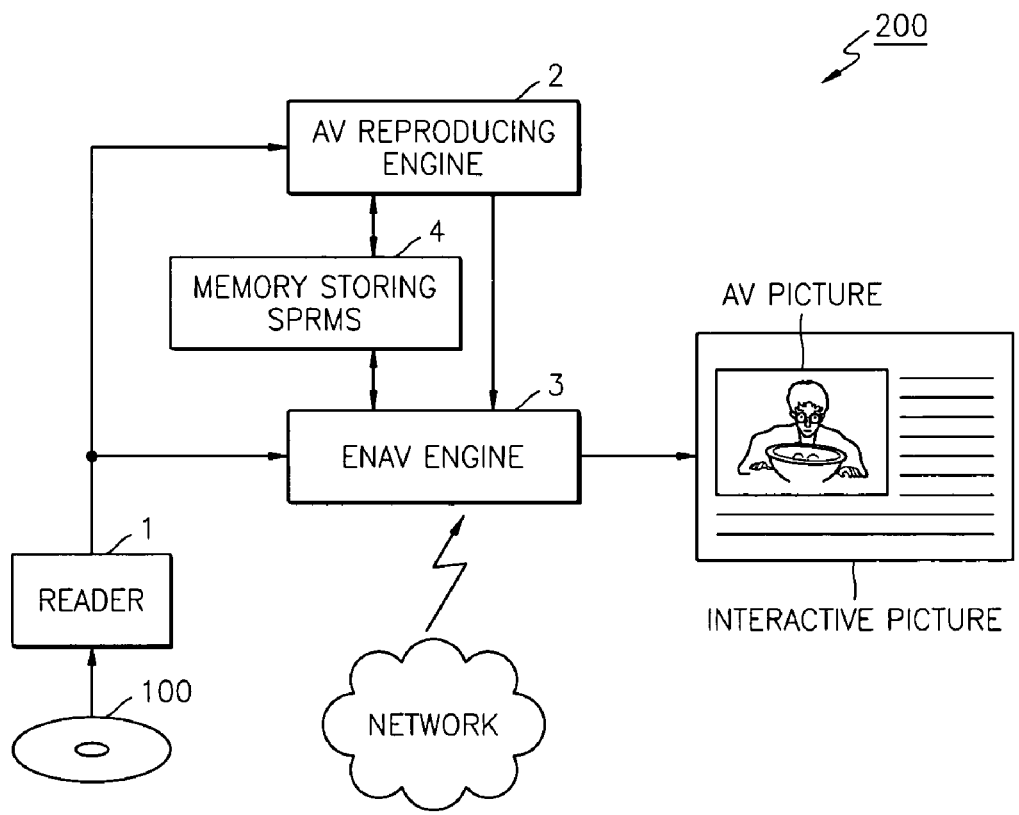
FIG. 6 is a block diagram of a reproduction apparatus according to an embodiment of the present invention.

FIG. 6 is a block diagram of the reproduction apparatus 200 according to an embodiment of the present invention. Referring to FIG. 6, the reproduction apparatus 200 includes a reader 1, an AV reproducing engine 2, an ENAV engine 3, and a memory storing SPRMs 4.

The reader 1 reads AV data, i.e., DVD-Video data and ENAV files from the DVD 100 according to a control signal sent from the ENAV engine 3. The AV reproducing engine 2 reproduces the AV data read by the reader 1. Because the AV data is DVD-Video data, the AV reproducing engine 2 is implemented by a DVD-Video reproduction engine reproducing DVD-Video data. The AV reproducing engine 2 is communicated with the ENAV engine 3 through an Application Program Interface (API). That is, the AV reproducing engine 2 informs the ENAV engine 3 of a property indicating a status of the AV reproducing engine 2 in response to a request sent from the ENAV engine 3, and sends a trigger to the ENAV engine 3. For example, in a case where a corresponding quiz is displayed on an interactive screen simultaneously with a battle scene while a movie, such as "Starwars," is shown in an interactive mode, the trigger informs the ENAV engine 3 of related information when the battle scene is displayed.

The ENAV engine 3 reproduces the ENAV files. Particularly, in the present embodiment, the ENAV engine 3 verifies, interprets, and executes a markup document as an ENAV file in order that the DVD-Video data recorded on the DVD 100 can be reproduced in the interactive mode. Also, the ENAV engine 3 blends and outputs a reproduced DVD-Video stream and an interpreted markup document. Accordingly, a picture in which an AV picture is embedded in an interactive picture is displayed on the display apparatus 300. Meanwhile, the ENAV engine 3 can include various plug-ins. Plug-ins are used to open various formats of files included in the markup document or linked with the markup document. For example, to reproduce AV data for a window media player, the ENAV engine 3 can call up the window media player. Also, the ENAV engine 3 accesses a network and can get desired information such as the ENAV file.

Particularly, in the present embodiment, the ENAV engine 3 parses language information recorded on a startup file, compares the language information with player language information recorded on a system parameter table, and selects a corresponding loading information file according to the compared result. The loading information file includes a list of ENAV files that should be buffered in advance or during reproducing for seamless reproduction. The ENAV engine 3 buffers ENAV files according to a selected loading information file in a buffer (not shown) included in the ENAV engine 3 and then interprets and executes from an initial file of the ENAV files.

FIG. 7 shows a startup file STARTUP.MLS according to an embodiment of the present invention. Referring to FIG. 7, the startup file STARTUP.MLS being a markup document written in a markup language includes two elements: one is a "walledgarden" element and the other is a "loadinginfo" element.

The "walledgarden" element includes links to a walled garden list file that lists a network area allowing access through an inserted ENAV disk 100, or files allowing access according to a parental level. The "walledgarden" element may or may not be recorded on the start up file.

The "loadinginfo" element includes links to a loading information file indicating location information for ENAV files belonging to an ENAV application, in order to load the ENAV application which is a set of ENAV files required when reproducing data in the interactive mode. By using a "condition" element included in the "loadinginfo" element, condition information selecting one among a plurality of ENAV applications is recorded. In more detail, the condition information selecting the ENAV application is recorded using a "name" property and a "value" property included in the "condition" element.

The startup file shown in FIG. 7 includes two "loadinginfo" elements. A reference number A indicates a part on which a first "loadinginfo" element is recorded and a reference number B indicates a part on which a second "loadinginfo" element is recorded. The "name" and "value" property values of the "condition" element included in the first "loadinginfo" element are recorded as "lang" and "en" respectively, to indicate that the contents of an ENAV file included in an ENAV application referred to by the first "loadinginfo" element is made with English. The "name" and "value" property values of the "condition" element included in the second "loadinginfo" element are recorded as "lang" and "kr", respectively, to indicate that the contents of an ENAV file constructing a referred ENAV application is made with Korean. The application language is expressed by lower case English letters consisting of two characters as defined in ISO-639.

FIG. 8 shows a startup file STARTUP.MLS according to another embodiment of the present invention. Referring to FIG. 8, the startup file STARUP.MLS includes two elements: one is a "walledgarden" element and the other is an "application" element. The "walledgarden" element has the same meaning as in FIG. 7.

The "application" element includes links to a loading information file indicating location information for ENAV files belonging to an ENAV application, in order to load the ENAV application which is a set of ENAV files required when reproducing data in the interactive mode. A "condition" element included in the "application" element is used to record a condition selecting one among a plurality of ENAV applications to which the startup file is linked. A "param" element included in the "condition" element is used to represent a property value that provides a selection criterion selecting a corresponding ENAV application. In more detail, the condition information selecting the ENAV application is recorded using a param "name" property and a "value" property included in the "condition" element.

A reference number C represents an ENAV application referred by a first "application" element and a reference number D represents an ENAV application referred by a second "application" element. The ENAV application referred by the first "application" element indicates that contents included in the corresponding ENAV file are made with English. The ENAV application referred by the second "application" element indicates that contents included in the corresponding ENAV file is the same as in the first application, except it is made with Korean. The application language is expressed by lower case English letters consisting of two characters as defined in an ISO-639 standard.

A conventional interactive mode has not considered that a readable language is different according to users. However, the present invention provides a plurality of interactive data, the contents of which are each made with a different language, considering that a readable language is different according to users, and allows a user to select one among the plurality of interactive data. Furthermore, because language information selecting an ENAV application is recorded on a startup file, the reproducing apparatus 200 can select an ENAV application corresponding to predetermined player language information when being first operated.

FIG. 9 shows a system parameter table storing language information, according to an embodiment of the present invention. Referring to FIG. 9, the system parameter table is stored in the reproducing apparatus 200. System parameters 0 through 20 are implemented using a system parameter table according to System Parameters (SPRMs) defined in a DVD-Video standard (DVD specifications for Read-Only Disc Part 3 Video Specifications), considering compatibility. In more detail, one among the system parameters included in the system parameter table can be used as language information, or a new format of system parameter table can be implemented by adding the player language information to the system parameter table. A value having a fixed length of 2 bytes is stored in SPRM and each parameter has a 16-bit integer value. Detailed descriptions for SPRMs 0 through 20 are disclosed in the DVD-Video standard and therefore the descriptions for parameters without direct-relation to the present invention are omitted.

1. Case where SPRM 0 is used as player language information according to the present invention:

SPRM 0 stores information of a language that a user uses to create a DVD-Video menu. The reproducing apparatus 200 compares a value set in SPRM 0 with language information recorded on an ENAV disk 100, and can select an ENAV application created with the same language as the menu, as an ENAV application to be first executed.

2. Case where SPRM 16 is used as player language information according to the present invention:

The value of SPRM 16 can be changed only when the reproducing apparatus is initialized and cannot be changed while the reproducing apparatus is being reproduced or operated. SPRM 16 stores language information of an audio stream to be reproduced simultaneously when a DVD-Video is reproduced, in a format defined in the ISO-639 standard. Therefore, the reproducing apparatus 200 can select an ENAV application to be first executed, with reference to the value set in SPRM 16.

3. Case where SPRM 18 is used as player language information according to the present invention:

The value of SPRM 18 also can be changed only when the reproducing apparatus is initialized and cannot be changed while the reproducing apparatus is being reproduced or operated. SPRM 18 stores language information displaying a caption of a DVD-Video, in a format defined in the ISO-639. In most cases, users see a caption of a movie made with their local language while hearing an audio of an original language used where the movie is made. Accordingly, the reproducing apparatus 200 selects an ENAV application, the contents of which are made with the same language as the caption, with reference to the language information displaying the caption in the DVD-Video. That is, the reproducing apparatus 200 selects the ENAV application with reference to the values stored in SPRM 18.

4. Case where player language information according to the present invention is recorded on SPRM 21:

According to the DVD-Video standard, SPRMs 21 through 23 are reserved areas. Accordingly, the present embodiment records the player language information (Initial Language Code) in a format defined in the ISO-639 standard on one among the empty SPRMs, for example, on SPRM 21. The value of SPRM 21 can also be changed only when the reproducing apparatus is initialized and cannot be changed while the reproducing apparatus is being reproduced or operated.

FIG. 10 is a view explaining the data structure of the player language information recorded as the system parameter of FIG. 9. Referring to FIG. 10, the player language information is recorded using 2 bytes allocated to SPRM 21. The remaining bits not used in recording the language information thereon are reserved and can be used to store other information. SPRM 21 can be recorded in a format defined in the ISO-639 standard or according to other standards.

Figure 11:
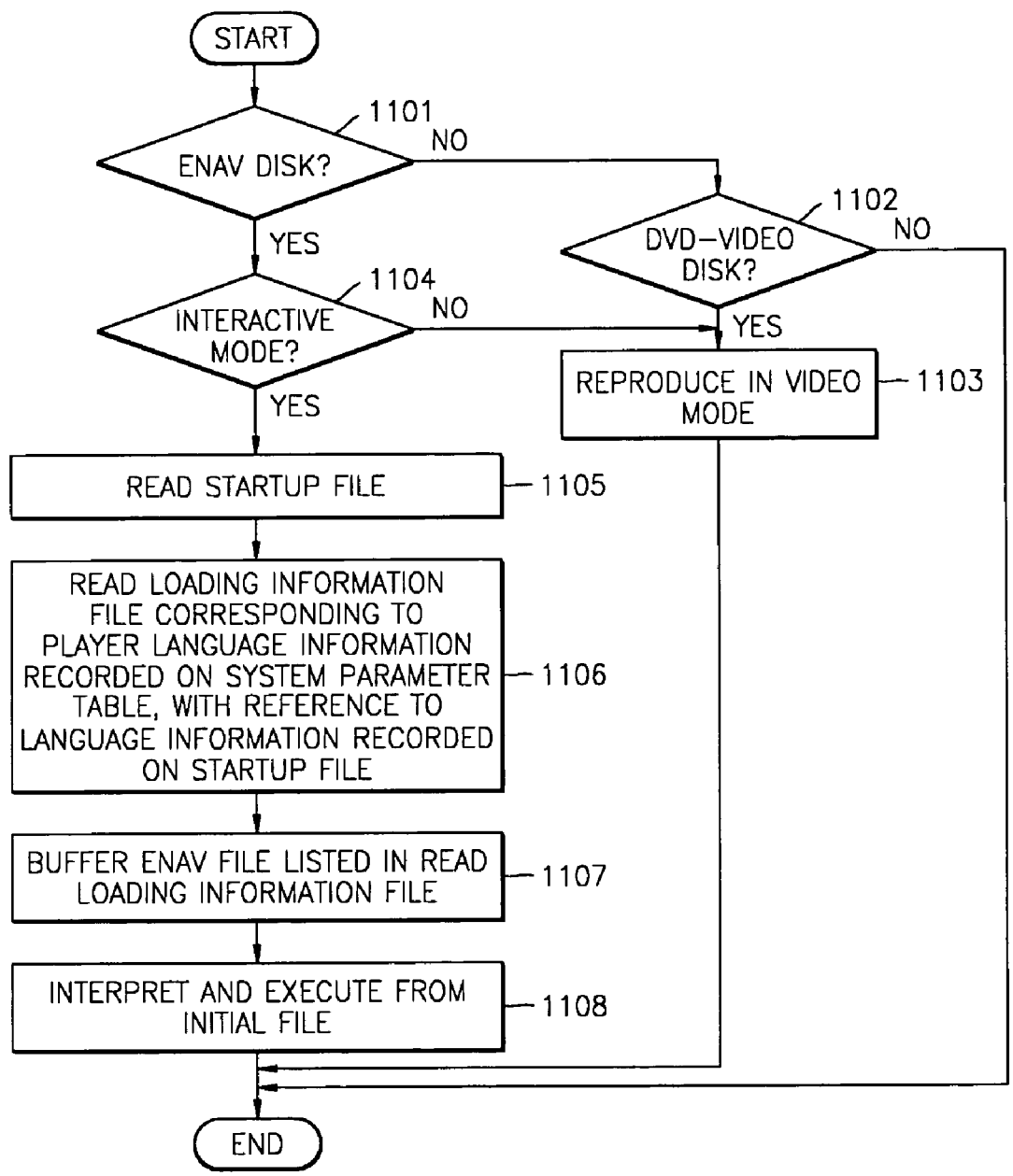
FIG. 11 is a flowchart explaining a reproduction method according to an embodiment of the present invention.

FIG. 11 is a flowchart explaining a reproduction method according to an embodiment of the present invention. Referring to FIG. 11, if an ENAV disk 100 is loaded in a reproducing apparatus 200, the reproducing apparatus 200 checks a startup file stored in a directory DVD_ENAV and determines whether the loaded disk is an ENAV DVD 100 (operation 1101). If the reproducing apparatus 200 cannot find a startup file, the reproducing apparatus 200 determines whether the loaded disk is a conventional DVD-Video disk (operation 1102). If the loaded disk is a DVD-Video disk, the reproducing apparatus 200 reproduces the disk in a video mode (operation 1103). The reproducing apparatus 200 does not reproduce the disk if the disk is another type of disk.

If the reproducing apparatus 200 finds a startup file and determines that the loaded disk is the ENAV disk 100 (operation 1101) and if a user selects a video mode, the reproducing apparatus 200 reproduces the loaded disk in the video mode (operation 1103). If the user selects an interactive mode (operation 1104), the reproducing apparatus 200 reads the startup file (operation 1105), reads language information recorded on the startup file, and reads a loading information file corresponding to player language information recorded on a system parameter table (operation 1106). Then, the reproducing apparatus 200 buffers ENAV files listed in the read loading information file (operation 1107), interprets and executes from a first ENAV file, and reproduces selected AV data in the interactive mode (operation 1108).

Meanwhile, the above-described reproducing method may be embodied as a program on a computer readable medium including, but not limited to storage media, such as magnetic storage media (e.g., ROM's, floppy disks, hard disks, etc.), optically readable media (e.g., CD-ROMs, DVDs, etc.) and carrier waves (e.g., transmissions over the Internet).

As described above, the present invention provides an information storage medium, having a data structure capable of selecting additional contents made with a language selected by a user or with a predetermined language and reproducing AV data in an interactive mode when an information storage medium storing AV data is reproduced, and a reproducing apparatus and reproducing method thereof.

Therefore, the reproducing apparatus can select an ENAV application to be first executed in the interactive mode and reproduce the selected ENAV application with a language readable by a user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reproducing method of reproducing audio-video (AV) data using a reproducing apparatus, the method comprising:
    selecting an interactive mode of the reproducing apparatus in which the reproducing apparatus reproduces the AV data to display an AV picture, and reproduces interactive data to display an interactive picture in which the AV picture is embedded, the interactive data comprising additional contents in a plurality of different natural languages, the reproducing apparatus also being operable in a video mode in which the reproducing apparatus reproduces the AV data to display the AV picture without reproducing the interactive data;
    reading a startup file of the interactive data, the startup file comprising language information identifying the plurality of different natural languages of the additional contents of the interactive data;
    reading the language information from the startup file;
    determining which one of the plurality of different natural languages identified by the read language information is the same as a natural language identified by player language information stored in the reproducing apparatus;
    reading a portion of the interactive data comprising additional contents in the one natural language that is the same as the natural language identified by the player language information stored in the reproducing apparatus;
    interpreting and executing the read portion of the interactive data to display the interactive picture, the interactive picture displaying the additional contents in the one natural language that is the same as the natural language identified by the player language information stored in the reproducing apparatus; and
    reproducing the AV data to display the AV picture embedded in the interactive picture, wherein:
    the reading of the language information from the startup file comprises reading from the startup file language information recorded using an element linking a loading information file of a corresponding enhanced navigation (ENAV) application of the interactive data;
    the determining of which one of the plurality of different natural languages comprises:
        comparing the read language information with the player language information; and
        selecting one ENAV application from a plurality of ENAV applications based on a result of the comparing: and
    the reading of the language information further comprises parsing the language information recorded using a "name" property and a "value" property in an element that stores a condition selecting a linked loading information file, included in the element linking the loading information file.

2. The reproducing method of claim 1, wherein the language information read from the startup file comprises language information identifying a plurality of different natural languages used in a plurality of enhanced navigation (ENAV) applications of the interactive data, each of which comprises substantially similar additional contents but in a natural language that is different from natural languages of additional contents of the other ENAV applications.

3. The reproducing method of claim 1, wherein the determining of which one of the plurality of different natural languages further comprises reading the player language information stored in the reproducing apparatus from a system parameter table stored in the reproducing apparatus in which the player language information is stored as a system parameter.

4. The reproducing method of claim 1, wherein the determining of which one of the plurality of different natural languages further comprises reading a system parameter SPRM 0 according to a DVD-Video standard that is stored in the reproducing apparatus as the player language information stored in the reproducing apparatus.

5. The reproducing method of claim 1, wherein;
    the loading information file of the corresponding ENAV application indicates location information of ENAV files belonging to the corresponding ENAV application; and
    the reading of a portion of the interactive data comprises reading the ENAV files belonging to the corresponding ENAV application with reference to the loading information file of the corresponding ENAV application.

6. The reproducing method of claim 1, wherein the "value" property is recorded as a language code having two characters according to an ISO 639 standard.

7. A method of reproducing audio-video (AV) data and enhanced navigation (ENAV) data from an optical disk using a reproducing apparatus, the method comprising:
    selecting an interactive mode from a plurality of modes comprising the interactive mode and a video mode, the interactive mode being a mode in which the AV data is reproduced to display an AV picture and the ENAV data is reproduced to display an interactive picture in which the AV picture is embedded, and the video mode being a mode in which the AV data is reproduced to display the AV picture and the ENAV data is not reproduced;
    reading language information from a startup file of the ENAV data on the optical disk, the language information identifying a plurality of different natural languages used in the ENAV data;

determining which one of the plurality of different natural languages identified by the read language information is the same as a natural language identified by player language information stored in the reproducing apparatus;

reading a portion of the ENAV data based on a result of the determining, the read portion of the ENAV data being in the one natural language that is the same as the natural language identified by the player language information stored in the reproducing apparatus;

executing the read portion of the ENAV data to display the interactive picture; and reproducing the AV data from the optical disk to display the AV picture embedded in the interactive picture;

wherein:

the reading of the language information from the startup file comprises reading from the startup file language information recorded using an element linking a loading information file of a corresponding ENAV application of the ENAV data;

the determining of which one of the plurality of different natural languages comprises:

comparing the read language information with the player language information; and selecting one ENAV application from a plurality of ENAV applications based on a result of the comparing, and the reading of the language information further comprises parsing the language information recorded using a "name" property and a "value" property in an element that stores a condition selecting a linked loading information file, included in the element linking the loading information file.

8. The reproducing method of claim 7, wherein the determining of which one of the plurality of different natural languages further comprises reading the player language information from a system parameter table stored in the reproducing apparatus.

9. A method of reproducing audio-video (AV) data in an interactive mode supported by interactive data associated with the AV data, the method comprising:

selecting an interactive mode from a plurality of modes comprising the interactive mode and a video mode, the interactive mode being a mode in which the AV data is reproduced to display an AV picture and the interactive data is reproduced to display an interactive picture in which the AV picture is embedded, and the video mode being a mode in which the AV data is reproduced to display the AV picture and the interactive data is not reproduced;

reading language information from a startup file of the interactive data, the language information identifying a plurality of different natural languages used in the interactive data;

reading a portion of the interactive data that is in one of the plurality of different natural languages identified by the read language information that is the same as a predetermined natural language; and interpreting and executing the read portion of the interactive data to display the interactive picture;

wherein:

the predetermined natural language is a natural language that is identified by player language information stored in a reproducing apparatus;

the interactive data comprises a plurality of loading files respectively corresponding to the plurality of different natural languages used in the interactive data, each of the loading files identifying an interactive data file corresponding to a respective one of the plurality of different natural languages;

the startup file lists the plurality of loading files in association with the language information identifying the plurality of different natural languages used in the interactive data;

the reading of the language information comprises reading the startup file and identifying the interactive data file corresponding to each of the plurality of different natural languages used in the interactive data; and the reading, of a portion of the interactive data comprises:

determining which one of the plurality of different natural languages identified by the read languages information is the same as the natural language identified by the player language information stored in the reproducing apparatus; and reading the interactive data file identified in the reading of the language information as corresponding to the one of the plurality of different natural languages that is the same as the natural language identified by the player language information stored in the reproducing apparatus.

10. The reproducing method of claim 9, further comprising reproducing the AV data to display the AV picture embedded in the interactive picture.

11. The reproducing method of claim 9, wherein the natural language identified by the player language information is a natural language specified by a user of the reproducing apparatus.

12. The reproducing method of claim 9, wherein the natural language identified by the player language information is a natural language of a menu of the reproducing apparatus, or a natural language of an audio stream to be reproduced by the reproducing apparatus, or a natural language of a caption to be reproduced by the reproducing apparatus, or a natural language of a portion of the interactive data to be read in the reading of a portion of the interactive data.

13. The reproducing method of claim 1, wherein the startup file and the language information are not read in the video mode.

14. The reproducing method of claim 7, wherein the language information is not read from the startup file in the video mode.

15. The reproducing method of claim 9, wherein the language information is not read from the startup file in the video mode.

* * * * *

UNITED STATES PATENT AND TRADEMARK OFFICE
CERTIFICATE OF CORRECTION

PATENT NO.        : 7,596,579 B2
APPLICATION NO. : 10/796284
DATED             : September 29, 2009
INVENTOR(S)       : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this

Fourteenth Day of December, 2010

David J. Kappos
*Director of the United States Patent and Trademark Office*